Nov. 21, 1950     Z. R. STANLEY     2,530,548
ELECTRICAL PANELBOARD SWITCH

Filed May 31, 1946     3 Sheets-Sheet 1

INVENTOR.
Z. ROY STANLEY
BY
AGENT

Nov. 21, 1950        Z. R. STANLEY        2,530,548
ELECTRICAL PANELBOARD SWITCH
Filed May 31, 1946        3 Sheets-Sheet 2
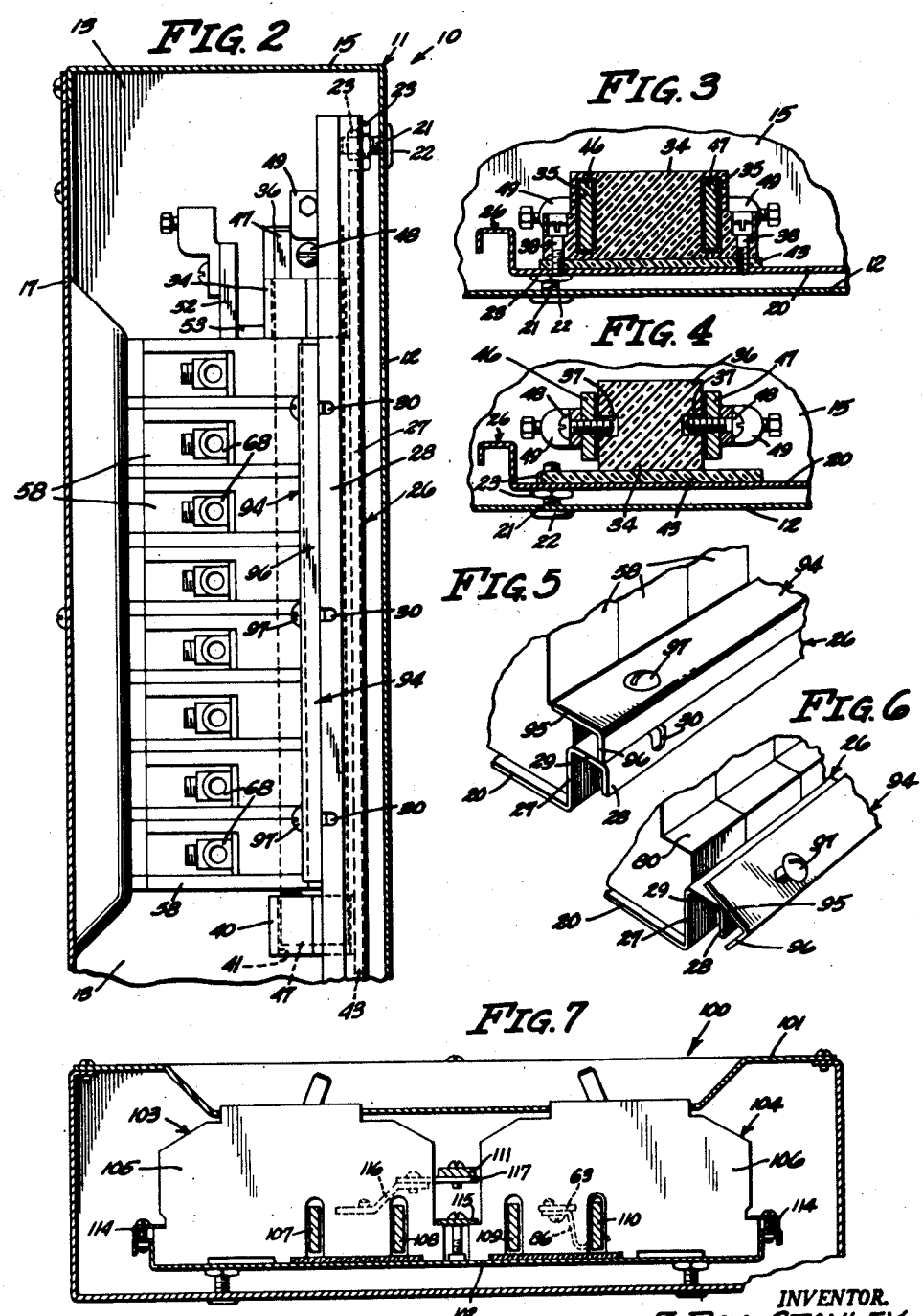
INVENTOR.
Z. ROY STANLEY
BY
AGENT

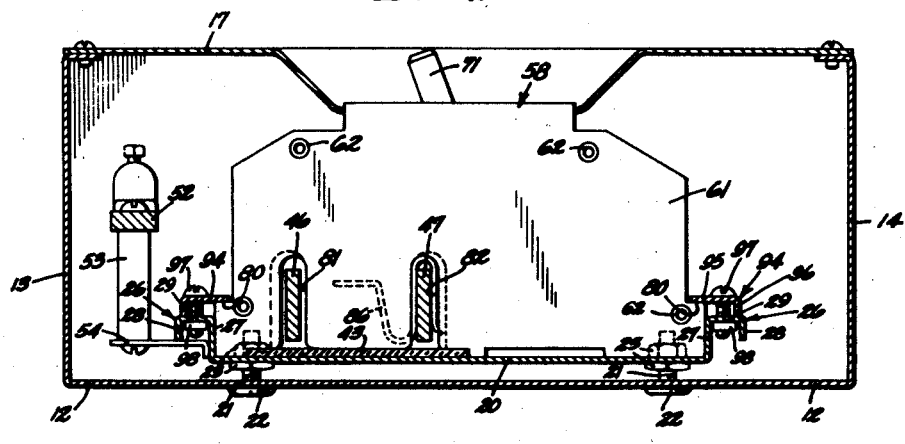

Patented Nov. 21, 1950

2,530,548

UNITED STATES PATENT OFFICE 2,530,548

ELECTRICAL PANEL BOARD SWITCH

Zina Roy Stanley, Monterey Park, Calif., assignor to Zinsco Electrical Products, Los Angeles, Calif.

Application May 31, 1946, Serial No. 673,339

2 Claims. (Cl. 175—369)

1

This invention relates to electrical panelboards and more particularly to the mounting of circuit breakers or similar electrical devices on such panelboards.

In an electrical service installation for a building, the main lines feeding electric current to the building are brought to a suitable location within the building. From this location, branch circuits extend to supply various electrical requirements throughout the building such as lighting, heating, and power. To protect the branch circuits against overload or short circuit conditions, circuit breakers are widely used, one circuit breaker usually being employed with each branch circuit. Suitable housings, known in the art as panelboards, serve to house a group of circuit breakers, the latter being arranged within the housing in one or more rows in a manner well-known in the art. Provided within such panelboards are copper bus bars which are connected to the main feeders and serve to distribute current to the circuit breakers.

The mounting of such circuit breakers on the panelboard and connecting the line terminals of the circuit breakers to the bus bars has heretofore required a considerable amount of painstaking work. First, the circuit breakers must be secured to the panelboard. This requires drilling and tapping holes in the panelboard to receive screws which pass through suitable holes in the circuit breaker housings, there usually being two such mounting holes in each circuit breaker.

After the circuit breakers are thus mounted, the line terminals of the breakers must be electrically connected to the bus bars. Small copper bars known as jumpers are usually employed for this purpose. Each jumper is secured to a bus bar by a screw which passes through a suitable hole in the jumper and is received by a threaded hole in the bus bar. The jumper must be bent and shaped so as to extend from the bus bar to the line terminal of the circuit breaker while maintaining proper clearance between the jumper and other bus bars and panelboard parts.

It is, accordingly, an object of the present invention to provide a combined panelboard and circuit breaker in which the circuit breaker may be electrically connected with a bus bar by simply "plugging" the breaker into the panelboard.

Another object is the provision of a circuit breaker and bus bar combination whereby the bus bar passes through the circuit breaker housing thereby saving considerable depth in the panelboard when compared with the conventional arrangement in which the circuit breakers are

2 mounted in front of and in spaced relation to the bus bars.

A further object of my invention is the provision of a circuit breaker which may be readily connected to either one of a plurality of bus bars.

Another object of this invention is the provision of a panelboard in which a circuit breaker may be readily connected to a bus bar at any desirable location longitudinally of the bus bar without the use of jumpers and without the use of screws and threaded holes in the bus bar.

Still another object of the present invention is the provision of a panelboard in which means is provided for readily securing a plurality of circuit breakers in position on the panelboard without using mounting screws in each individual breaker as aforementioned.

Further objects and advantages of this invention will become apparent in the following description taken in view of the accompanying drawings, in which:

Fig. 2 is a vertical sectional view taken on line 2—2 of Fig. 1.

Figure 1:
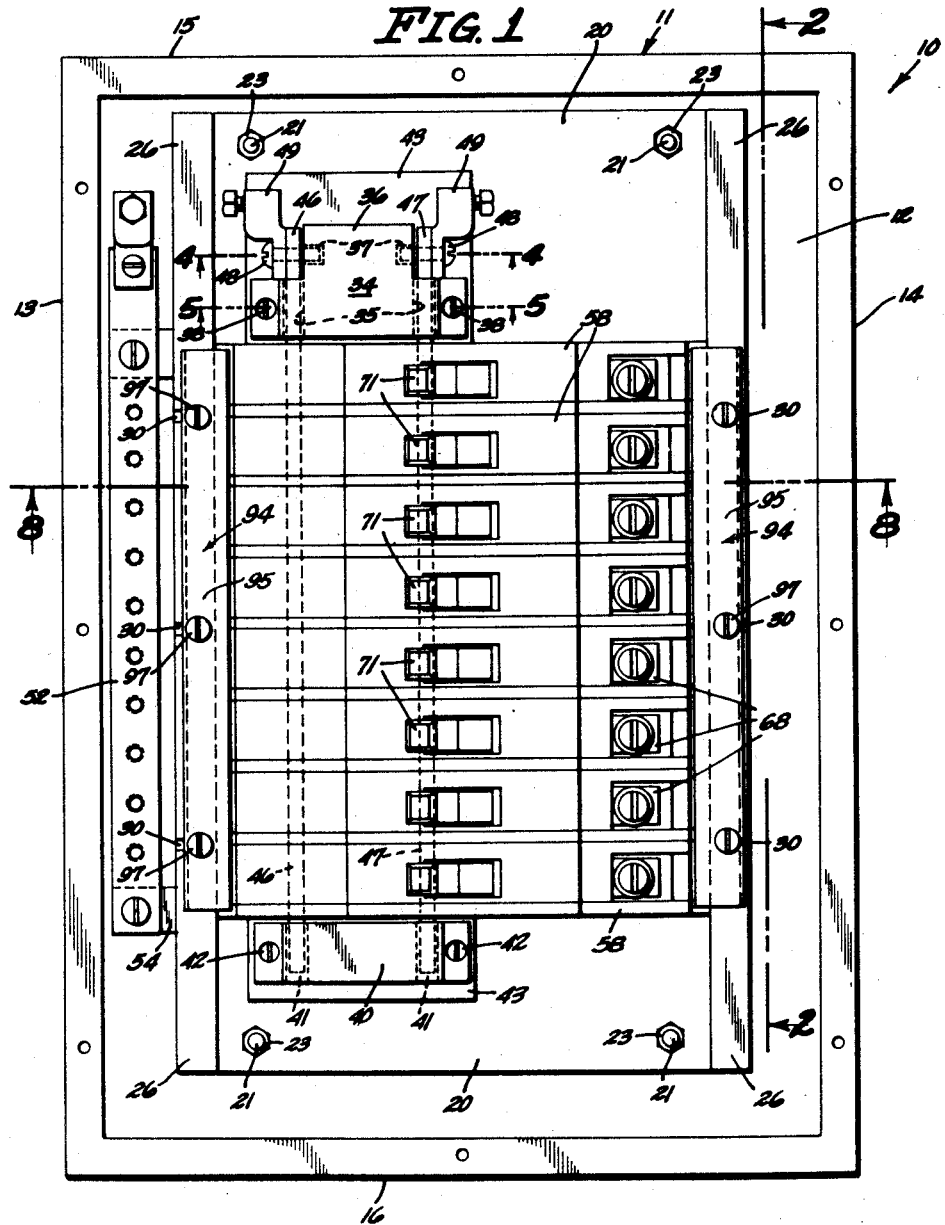
Fig. 1 is a front elevational view of a panelboard, with the front cover removed, illustrating a preferred form of circuit breaker mounting of the present invention.

Figs. 3 and 4 are fragmentary, horizontal sectional views taken on lines 3—3 and 4—4, respectively of Fig. 1.

Figs. 5 and 6 are fragmentary perspective views of a clamp included in the preferred embodiment of the present invention.

Fig. 7 is a transverse sectional view of a modified form of circuit breaker mounting of my invention.

Fig. 8 is a horizontal sectional view taken on line 8—8 of Fig. 1.

Fig. 9 is an enlarged view of a circuit breaker included in the present invention, the cover being removed from the circuit breaker.

Fig. 10 is a bottom view looking in the direction of the arrow 10 of Fig. 9.

Referring specifically to the drawings, a preferred form of panelboard 10 of the present invention is shown in Fig. 1. The panelboard 10 includes a cabinet 11 having a back wall 12, side walls 13 and 14, top and bottom walls 15 and 16 respectively and a cover plate 17, the latter being shown in Figs. 2 and 8.

Mounted on the back wall 12 of the cabinet 11 is a pan 20 supported by four bolts 21, the heads 22 of which are welded to the wall 12 as seen in Figs. 2 and 8. The pan 20 is held between nuts 23 threaded on the bolts 21, the pan 20 being adjustable toward or away from the cabinet back 12 by adjusting the nuts 23. Formed along side edges of the pan 20, as seen in Fig. 8, are channels 26 having inner flanges 27, outer flanges 28 and a connecting web 29. The channels 26 have slots 30, as seen in Figs. 2 and 5, the slots 30 extending across the webs 29 and into the outer flanges 28 of the channels 26.

Mounted on the pan 20 near the upper end thereof, as shown in Figs. 1, 3, and 4, is bus bar mounting block 34. The block 34 is made of electrical insulating material and is moulded to provide two holes 35 extending vertically therethrough, these holes being rectangular in cross-section as seen in Fig. 3. The block 34 is reduced in width at its upper side to provide an extension 36 having holes 37 on opposite sides thereof. The block 34 is secured to the pan 20 by screws 38 as shown in Figs. 1 and 3.

Mounted on the pan 20 near the lower end thereof is a second bus bar mounting block 40 of insulating material formed to provide holes 41, the latter being aligned with the holes 35 of the upper block 34. The block 40 is secured to the pan 20 by screws 42. Between the mounting blocks 34 and 40 and the pan 20 is a sheet 43 of electrical insulating material.

Loosely received by the holes 35 and 41 of the blocks 34 and 40 respectively are copper bus bars 46 and 47. Fixed on upper ends of the bus bars 46 and 47 by screws 48 are terminal lugs 49. The screws 48 extend into the holes 37 of the block 34 thereby locking the bus bars 46 and 47 against vertical movement relative to the blocks 34 and 40.

Provided at one side of the pan 20, as seen in Figs. 1 and 8, is a neutral bus bar 52 supported by means of posts 53 of insulating material the latter being attached to brackets 54 extending from the pan 20.

Mounted on the pan 20, as shown in Figs. 1, 2, and 8, is a row of circuit breakers 58. Each of the circuit breakers 58 is similar to the one disclosed in my copending application for United States Letters Patent, Serial Number 651,829, filed March 4, 1946, except for the means provided in the circuit breaker of the present invention for electrically connecting the breaker 58 to the bus bars 46 and 47.

The circuit breaker 58, shown in Fig. 9, includes a housing 59 formed to provide a cavity 60 shaped to accommodate the working parts. Fixed on the housing 59 is a cover plate 61 (see Fig. 10) secured by tubular rivets 62. Within the housing 59 is a line terminal plate 63 having a contact point 64 and a threaded hole 65. The plate 63 is slidably received by a channel 66 and shoulder 67 formed in the housing 59. Provided at the right hand side of the housing 59 is a load terminal 68 accessible from the outside of the housing. The working parts of the circuit breaker 58 include a pivoted switch arm 70 for making and breaking contact with the contact point 64 on the line terminal plate 63. A handle 71 is pivoted in the housing 59 for manual operation of the switch arm 70.

Automatic opening of the switch arm 70 in the event of overload or short circuit is accomplished by means of a coil 72 and core 74, the coil 72 being controlled by a bimetallic element 73. When the bimetallic element 73 functions in response to overload conditions, the coil 72 is caused to actuate an armature 75. Movement of the armature 75 toward the core 74 releases a trip arm 76 causing the switch arm 70 to break the circuit.

A more detailed description of the working parts and the function of the circuit breaker 58 may be had by reference to the above mentioned copending application.

As shown in Figs. 8 and 9, the circuit breaker housing 59 is formed to provide shoulders 80 at opposite ends thereof for clamping the circuit breaker 58 against the pan 20 as hereinafter described. Formed on the back side of the circuit breaker housing 59 is a pair of openings 81 and 82 which extend transversely through the housing 59 and cover plate 61 as shown in Fig. 10. Also formed in the housing 59 midway between the openings 81 and 82 is a depression 83, the latter communicating with the line terminal plate 63 as shown in Fig. 9.

Removably mounted on the line terminal plate 63 is a clip 86 which serves to conduct current from one of the bus bars 46 or 47 to the terminal plate 63. An end 87 of the clip 86 has a hole for receiving a screw 88 the latter being screwed into the threaded hole 65 in the line terminal plate 63. The end of the clip 86 opposite the end 87 is U-shaped as indicated at 89 to approximately conform with the profile of the openings 81 and 82 of the housing 59. As seen in Figs. 8 and 9, the openings 81 and 82 are slightly larger than the U-shaped portion 89 to allow movement of a free leg 90 of the U-shaped portion 89. The clip 86 may be mounted with the U-shaped portion 89 thereof disposed in either one of the openings 81 or 82 for selective engagement with either one of the bus bars 46 and 47.

The circuit breakers 58 are mounted on the pan 20 in the following manner: The cover 17 of the cabinet 11 is removed and the circuit breakers 58 are individually forced against the pan 20 with the bus bars 46 and 47 disposed in the openings 81 and 82 of the circuit breaker housing 59. The bus bars slide into full engagement with the clips 86 thereby electrically connecting each of the circuit breakers with one or the other of the bus bars. In practice, the position of the clip 86 may be alternated in each successive one of a row of circuit breakers or otherwise arranged so as to draw an approximately equal flow of current from each of the bus bars.

After forcing the circuit breakers 58 against the pan 20 as aforedescribed, the breakers are clamped firmly in place against the pan 20 by means of two clamps 94 as shown in Figs. 1, 2, 5, 6, and 8. Each of the clamps 94 is angle-shaped in cross-section providing legs 95 and 96. Screws 97 extend through the clamps 94 and through the slots 30 of the channels 26 of the pan 20. Nuts 98 are threaded onto the screws 97, as seen in Fig. 8, the ends of the screws 97 being upset to prevent removal of the nuts 98. The nuts 98 are preferably square so as to be held against rotation by the flanges 27 and 28 of the channels 26. When the screws 97 are loose, the slots 30 permit swinging the clamps 94 outward, away from clamping engagement with the circuit breakers 58 as shown in Fig. 6. When in clamping position, the legs 95 of the clamps 94 rest on the shoulders 80 of the circuit breakers while the legs 96 rest on the webs 29 of the channels 26. The clamps 94 enable clamping an entire row of circuit breakers in the panel board 10 without handling two or more loose screws for each circuit breaker. Should it be necessary to remove any one of the circuit breakers 58, the clamps 94 are loosened and swing to the position shown in Fig. 6. This is accomplished without removing the screws 97, or removing the nuts 98 from the screws 97, thereby preventing loss of screws and nuts and greatly simplifying the replacement of circuit breakers in the panelboard 10.

The panelboard 10 is adapted for single phase wiring in a conventional manner well-known in the art. Each of the breakers 58 in the panelboard 10 may be used individually as single pole breakers or two adjacent breakers may be combined and used as a two pole breaker. In the latter case, the operating handles 71 of two adjacent breakers may be tied together by a bridge, not shown.

Reference is now made to Fig. 7 in which I have shown a modified form of panelboard 100, the latter being similar to the aforedescribed panelboard 10 but having two rows of circuit breakers mounted thereon and being suitable for three phase service installations. The panelboard 100 includes a cabinet 101 and pan 102 which are larger but otherwise similar to the aforedescribed cabinet 11 and pan 20 of the panelboard 10. Mounted on the pan 102 are two rows 103 and 104 of circuit breakers, one breaker of each row being shown in Fig. 7 and identified at 105 and 106. The breakers 105 and 106 are substantially identical to the aforedescribed breakers 58.

Bus bars 107, 108, 109, and 110 are loosely mounted in suitable insulating blocks (not shown) on the pan 102 in the same manner as above described in connection with the blocks 34 and 40 and bus bars 46 and 47 of the panelboard 10. Disposed between the rows 103 and 104 of circuit breakers is a central bus 111. The circuit breakers of the panelboard 100 are retained against the pan 102 by outer clamps 114 and a central clamp 115.

The circuit breaker 106 is identical with the aforedescribed circuit breaker 58 and may be electrically connected with either of the bus bars 109 or 110 by means of the clip 86 in the manner above described. The circuit breaker 105 has, in place of the terminal plate 63, a terminal bar 116 as disclosed in the copending application herein referred to. The bar 116 enables connecting the circuit breaker 105 to the central bus bar 111 by a jumper 117. In the panelboard 100, most of the circuit breakers in the rows 103 and 104 are similar to the breaker 106 having the clips 86 for connection with one of the bus bars 107, 108, 109 or 110. The remaining circuit breakers are provided with the terminal bars 116 for connection with the central bus bar 111.

The panelboard 100, when supplied with 220 volt, three phase current, may be wired in various ways, well-known in the art, to provide 110 volt, single phase lighting circuits, 220 volt single phase power circuits, 220 volt three phase power circuits, and others.

The ease with which the circuit breakers of the present invention may be mounted in the panelboards and electrically connected to the bus bars greatly simplifies the assembly and wiring of the panelboards. The present invention also provides a safer installation due to the elimination of exposed hot jumpers and wires heretofore employed.

Although I have shown and described but one form and one modification of the present invention, it is understood that various changes and further modifications may be made therein without departing from the spirit of the invention or the scope of the appended claims.

I claim as my invention:

1. In a circuit breaker, the combination of: a housing, line and load terminals thereon, a switch in said housing for closing and opening the circuit between said terminals, said housing being formed to provide a pair of spaced openings adapted to receive bus bars, said openings extending through the back and through both sides of said housing, a conductor clip, a lateral lug on said clip, said clip being removably attached to said line terminal by said lug by means located midway between said openings, said clip extending into and being engageable with a bus bar passing through one of said openings, said clip being reversible about said means to engage a bus bar passing through the other of said openings.

2. In a circuit breaker assembly, the combination of: a supporting member; a pair of bus bars parallel to each other, said bus bars being carried on, but electrically insulated from, said supporting member; a first member; a second member having means by which a supply conductor can be electrically connected thereto; bridging means by which the first member can be electrically connected to and disconnected from said second member; a frame on said supporting member for supporting said first member and said second member in rigid spaced relationship with each other, said bridging means being carried in said frame; and a clip secured to said first member by means having an axis passing midway between said bus bars, said clip being so secured to said first member by said means that it can be reversed about said axis to engage either of said bus bars and thus form an electrical connection between the bus bar so engaged and said first member.

Z. ROY STANLEY.

REFERENCES CITED

The following references are of record in the file of this patent:

UNITED STATES PATENTS

| Number | Name | Date |
| --- | --- | --- |
| 1,251,471 | Brooks | Jan. 1, 1918 |
| 1,768,879 | Baxter | July 1, 1930 |
| 1,867,271 | Larsen | July 12, 1932 |
| 1,872,296 | Jennings | Aug. 16, 1932 |
| 1,938,309 | Williams | Dec. 5, 1933 |
| 1,958,882 | Baxter | May 15, 1934 |
| 2,004,527 | Harvey | June 11, 1935 |
| 2,007,174 | Benjamin | July 9, 1935 |
| 2,039,793 | Harvey | May 5, 1936 |
| 2,044,604 | Cornell et al. | June 16, 1936 |
| 2,076,492 | Allen | Apr. 6, 1937 |
| 2,124,269 | Anderson et al. | July 19, 1938 |
| 2,162,344 | Frank et al. | June 13, 1939 |
| 2,261,987 | Frank et al. | Nov. 11, 1941 |
| 2,306,353 | Cole et al. | Dec. 22, 1942 |
| 2,351,631 | O'Brien | June 20, 1944 |
| 2,359,247 | Rowe | Sept. 26, 1944 |
| 2,402,682 | Shriro et al. | June 25, 1946 |
| 2,417,928 | Guernsey | Mar. 25, 1947 |